(12) United States Patent
Froemming et al.

(10) Patent No.: US 9,863,366 B2
(45) Date of Patent: Jan. 9, 2018

(54) EXHAUST NOZZLE APPARATUS AND METHOD FOR MULTI STREAM AIRCRAFT ENGINE

(71) Applicant: Rolls-Royce North American Technologies, Inc., Indianapolis, IN (US)

(72) Inventors: Kenneth W. Froemming, Carmel, IN (US); Bryan H. Lerg, Westfield, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 626 days.

(21) Appl. No.: 14/202,534

(22) Filed: Mar. 10, 2014

(65) Prior Publication Data

US 2014/0263712 A1    Sep. 18, 2014

Related U.S. Application Data

(60) Provisional application No. 61/780,951, filed on Mar. 13, 2013.

(51) Int. Cl.
*F02K 3/077*  (2006.01)
*F02K 1/30*  (2006.01)
*F02K 1/36*  (2006.01)
*F02K 1/38*  (2006.01)

(52) U.S. Cl.
CPC .............. *F02K 1/383* (2013.01); *F02K 1/30* (2013.01); *F02K 1/36* (2013.01); *F02K 3/077* (2013.01); *Y02T 50/672* (2013.01)

(58) Field of Classification Search
CPC ..... F02K 1/36; F02K 1/28; F02K 1/30; F02K 1/38–1/386; F02K 3/075; F02K 3/077
See application file for complete search history.

(56) References Cited

U.S. PATENT DOCUMENTS

| | | | | |
|---|---|---|---|---|
| 3,333,772 A | * | 8/1967 | Bruner | F02K 1/36 181/215 |
| 4,043,121 A | * | 8/1977 | Thomas | F02K 3/075 415/78 |
| 4,054,030 A | * | 10/1977 | Pedersen | F02K 3/075 415/145 |
| 4,064,692 A | * | 12/1977 | Johnson | F02K 3/075 60/262 |

(Continued)

*Primary Examiner* — Gerald L Sung
*Assistant Examiner* — Rene Ford
(74) *Attorney, Agent, or Firm* — Barnes & Thornburg LLP

(57) ABSTRACT

A multi stream aircraft fixed geometry nozzle includes an inner nozzle, an outer nozzle, and a supersonic ejector. The outer nozzle is configured to channel a third stream from an aft end of a third stream duct surrounding a bypass duct of a multi stream aircraft engine to the supersonic ejector to merge the third stream with the primary stream. The fixed geometry nozzle is configured to operate between an SFC mode and a thrust mode such that, when the inner nozzle accelerates the primary stream supersonically to the supersonic ejector, at which the primary stream is merged with the third stream, in the SFC mode the total pressure of the primary stream is substantially the same as the total pressure of the third stream, and in the thrust mode the total pressure of the primary stream is substantially greater than the total pressure of the third stream.

19 Claims, 8 Drawing Sheets

(56) References Cited

U.S. PATENT DOCUMENTS

| | | | |
|---|---|---|---|
| 4,080,785 A * | 3/1978 | Koff | F02K 3/077 415/69 |
| 5,351,480 A * | 10/1994 | Kretschmer | F02K 1/09 239/265.11 |
| 5,404,713 A * | 4/1995 | Johnson | F02K 1/825 60/204 |
| 5,586,431 A * | 12/1996 | Thonebe | F02K 1/36 239/127.3 |
| 5,664,415 A * | 9/1997 | Terrier | F02K 1/28 60/204 |
| 6,021,637 A * | 2/2000 | Scavo | F02K 1/30 239/265.17 |
| 6,112,512 A * | 9/2000 | Miller | F02K 1/28 239/265.17 |
| 6,666,016 B2 | 12/2003 | Papamoschou | |
| 7,140,174 B2 * | 11/2006 | Johnson | F02C 7/042 60/226.1 |
| 7,188,467 B2 * | 3/2007 | Johnson | F02C 7/042 60/226.1 |
| RE39,796 E | 8/2007 | Papamoschou | |
| 7,464,536 B2 | 12/2008 | Renggli et al. | |
| 2002/0066268 A1 | 6/2002 | Papamoschou | |
| 2005/0047942 A1 * | 3/2005 | Grffin, III | F02K 3/072 417/423.1 |
| 2005/0081509 A1 * | 4/2005 | Johnson | B64D 33/02 60/226.1 |
| 2005/0109012 A1 * | 5/2005 | Johnson | F02K 3/065 60/226.1 |
| 2006/0064961 A1 * | 3/2006 | Johnson | F02C 7/042 60/226.3 |
| 2007/0125065 A1 | 6/2007 | Renggli et al. | |
| 2007/0277530 A1 | 12/2007 | Dinu et al. | |
| 2008/0141655 A1 | 6/2008 | Johnson et al. | |
| 2008/0155961 A1 | 7/2008 | Johnson | |
| 2008/0170943 A1 * | 7/2008 | Cairo | F04D 29/023 416/224 |
| 2009/0067988 A1 | 3/2009 | S. Eluripati et al. | |
| 2009/0158703 A1 * | 6/2009 | Petty | F02K 1/386 60/230 |
| 2009/0255269 A1 * | 10/2009 | Petty | F02K 1/06 60/771 |
| 2010/0043393 A1 * | 2/2010 | Zamora | F02K 1/42 60/226.3 |

* cited by examiner

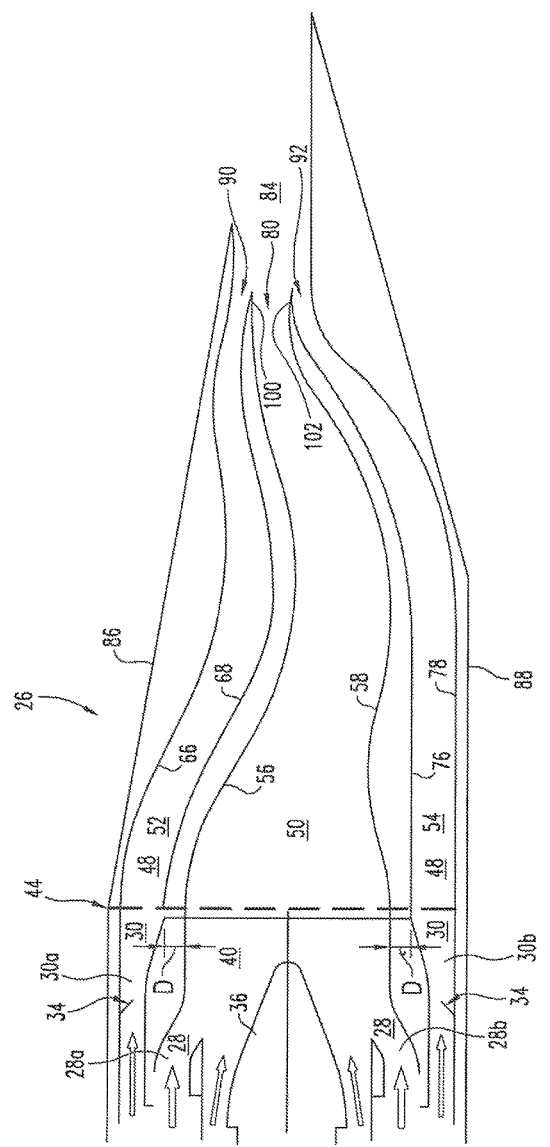

EXHAUST NOZZLE APPARATUS AND METHOD FOR MULTI STREAM AIRCRAFT ENGINE

PRIORITY CLAIM

This application claims priority under 35 U.S.C. § 119(e) to U.S. Provisional Application Ser. No. 61/780,951, filed Mar. 13, 2013, which is expressly incorporated by reference herein.

STATEMENT REGARDING FEDERALLY SPONSORED RESEARCH OR DEVELOPMENT

Embodiments of the present disclosure were made with government support under Contract No. F33615-03-D-2357. The government may have certain rights.

FIELD OF THE DISCLOSURE

The present disclosure relates generally to aircraft engine exhaust nozzle apparatuses and methods, and more specifically, but not exclusively, to aircraft exhaust nozzle apparatuses and methods that combine multiple varying flows.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Multiple stream aircraft engine exhaust nozzles, and methods for operating such exhaust nozzles in low and high power modes, remain an area of interest. Some existing systems have various shortcomings, drawbacks, and disadvantages relative to certain applications. Accordingly, there remains a need for further contributions in this area of technology.

SUMMARY

The present disclosure may comprise one or more of the following features and combinations thereof.

One embodiment of the present application is a multi stream aircraft fixed geometry nozzle in which an outer nozzle is configured to channel a third stream from an aft end of a third stream duct surrounding a bypass duct to a supersonic ejector, to merge the third stream with a primary stream of an inner nozzle of the fixed geometry nozzle.

Other embodiments include unique methods, systems, devices, and apparatus to provide for an exhaust nozzle and method of operating an exhaust nozzle, in low and high power modes.

These and other features of the present disclosure will become more apparent from the following description of the illustrative embodiments.

BRIEF DESCRIPTION OF THE DRAWINGS

Features of the application will be better understood from the following detailed description when considered in reference to the accompanying drawings, in which:

FIG. 2 shows an aft end of the FIG. 1 multi stream aircraft engine, including an exhaust nozzle thereof;

DETAILED DESCRIPTION OF THE DRAWINGS

Figure 1:
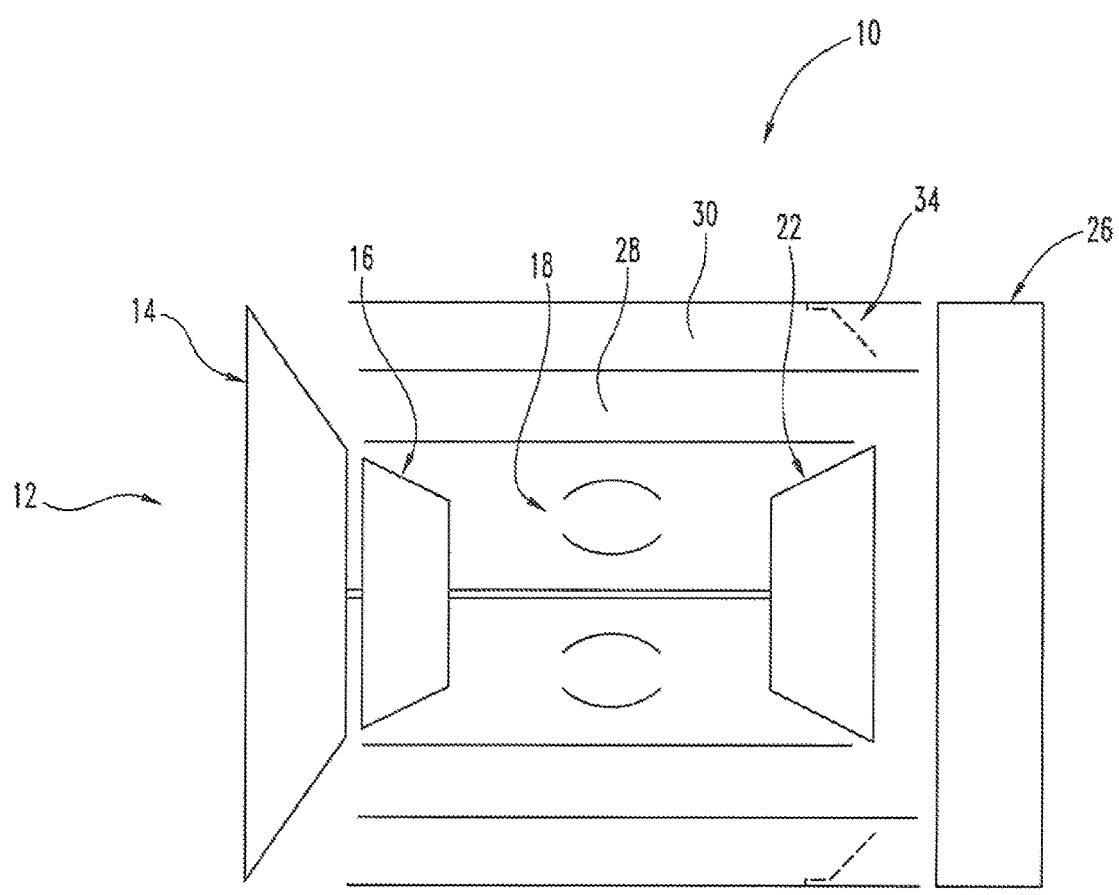
FIG. 1 shows a multi stream aircraft engine according to an embodiment.

For the purposes of promoting an understanding of the principles of the disclosure, reference will now be made to a number of illustrative embodiments illustrated in the drawings and specific language will be used to describe the same.

FIG. 1 shows a multi stream aircraft engine 10 according to an embodiment. The illustrative engine 10 comprises a gas turbine engine, and the description herein describes the gas turbine engine as merely a non-limiting example of a multi stream aircraft engine 10. It will be appreciated that the multi stream aircraft engine 10 can comprise any aircraft engine in which a multiple stream flow system is employed, and other embodiments are contemplated.

The multi stream aircraft engine 10 includes, in axial flow series, an air intake 12, a propulsive fan 14, a compressor 16, a combustor 18, a turbine 22, and a fixed geometry exhaust nozzle 26. Surrounding the compressor 16, the combustor 18, and the turbine 22, which are collectively referred to herein as the engine core of the multi stream aircraft engine 10, are a bypass duct 28 and a third stream duct 30, wherein the third stream duct 30 is disposed radially outward of the bypass duct 28.

In operation, the fan 14 accelerates, that is pressurizes, air entering the intake 12 to produce a core airstream into the compressor 16, a bypass airstream into the bypass duct 28, and a third airstream into the third stream duct 30. The third stream duct 30 channels the third airstream of pressurized air to the exhaust nozzle 26, which provides a component of the thrust output of the multi stream aircraft engine 10. The bypass duct 28 channels the bypass airstream of pressurized air to the downstream end of the turbine 22 of the multi stream aircraft engine 10. The compressor 16 compresses the core airstream of pressurized air, and the compressed air exhausted from the compressor 16 is directed into the combustor 18 where it is mixed with fuel and the mixture combusted. The resultant hot combustion products then expand through, and thereby drive, the turbine 22. The turbine 22 drives the compressor 16 and the propulsive fan 14 by suitable interconnecting shafts. Downstream of the turbine 22, the core airstream of hot combustion products merges with the bypass airstream from the bypass duct 28 to form a primary airstream, and the primary airstream is exhausted through the exhaust nozzle 26 to provide additional propulsive thrust. At a downstream end of the fixed geometry exhaust nozzle 26, the third airstream is merged with the primary airstream. As will be described in greater detail below, the exhaust nozzle 26 can serve to vary the effective area ratio of the primary airstream and to provide increases or decreases in the thrust of the multi stream aircraft engine 10.

The multi stream aircraft engine 10 can include a third stream pressure/area flow control device 34. In the illustrative embodiment, the flow control device 34 is located in the third stream duct 30 at the aft end of the third stream duct 30 axially adjacent to the entry of the exhaust nozzle 26. Located as such, the third airstream can serve as a buffer between the flow control device 34 and the relatively high temperature core airstream and bypass airstream. The flow control device 34 can comprise any suitable device for controlling flow of an airstream, for example, one or more control valves, one or more flaps, to name a few. The flow control device 34 can comprise any suitable material including, for example, a composite material.

During operation of the multi stream aircraft engine 10, the flow control device 34 can direct a portion of the pressurized air that is discharged from the fan 14 and into the third stream duct 30, into the bypass duct 28 and/or the compressor 16. Thus, the flow control device 34 can be configured to vary the amount of flow as between the compressor 16, the bypass duct 28, and the third stream duct 30, which, as will be described in greater detail below, can allow the flow control device 34 to control the amount of the primary airstream and the third airstream through the fixed geometry exhaust nozzle 26. In one form, the flow control device 34 can comprise an active means of directing flow, e.g., controlled by a flow device controller or the like (not shown). In another form, the flow control device 34 can comprise a passive system, e.g., controlled based on pressures and/or temperatures in one or more regions of the multi stream aircraft engine 10.

As will be appreciated, although referred to herein as a third stream pressure/area flow control device 34, and although illustrated as being disposed in the third stream duct 30, the flow control device 34 is not limited as such, and other configurations are contemplated. For example, the flow control device 34 can be disposed at the forward end of the third stream duct 30, or at the forward or aft end of the bypass duct 28. Further, the flow control device 34 can comprise multiple flow control devices disposed in multiple locations.

Referring now to FIG. 2, an aft end of the multi stream aircraft engine 10, including the exhaust nozzle 26 thereof, is depicted in greater detail. In the left side of FIG. 2, arrows represent the core airstream, the bypass airstream, and the third airstream, that pass through the respective engine core, bypass duct 28, and third stream duct 30, of the multi stream aircraft engine 10. In the illustrative embodiment, the core airstream and the bypass airstream merge, that is combine, in the area surrounding a plug nozzle or cone 36 of the turbine 22 to form the primary airstream. A primary airstream duct 40 channels the primary airstream to the entry of the exhaust nozzle 26. As shown in FIG. 2, the primary airstream duct 40 converges and then straightens out to become aligned with the axis of the multi stream aircraft engine 10, before reaching the entry of the exhaust nozzle 26. In one form, the primary airstream duct 40 can form an extension of the outer wall of the bypass duct 28. In another form, the primary airstream duct 40 can comprise structure that is separate from that of the bypass duct 28.

The geometry and relative positions of the bypass duct 28, the third stream duct 30, and the primary airstream duct 40 will depend on the application of the multi stream aircraft engine 10. In the FIG. 2 embodiment, the primary airstream duct 40 and the bypass duct 28 each have a substantially annular shape in axial cross-section at their forward ends that transitions and merges radially inwardly at their aft ends to a substantially cylindrical shape in axial cross-section. Further, the third stream duct 30 of the FIG. 2 embodiment has a substantially annular shape in axial cross-section at its forward and aft ends. For ease and clarity of description, the aft ends of the bypass duct 28 and the third stream duct 30 are also referred to herein as having radially upper and lower arc shape portions 28a, 28b, 30a, 30b, in axial cross-section. The terms upper and lower in this sense are not intended to be limiting but rather to indicate the position of portions of the bypass duct 28 relative to the core airstream and the position of arc portions of the third stream duct 30 relative to the primary airstream duct 40, as shown in FIG. 2.

The geometry and relative positions of the bypass duct 28, the third stream duct 30, and the primary airstream duct 40 are not limited to the configuration shown in FIG. 2, and other embodiments are contemplated. Thus, in one form, the aft ends of the bypass duct 28 and the third stream duct 30 can have rectangular ends and the upper and lower portions can comprise rectangular portions rather than arc portions. In another form, the bypass duct 28 and the third stream duct 30 can each have a substantially annular shape in axial cross-section, while the primary airstream duct 40 can have a substantially annular shape in axial cross-section at its forward end that transitions to a substantially rectangular shape in axial cross-section at its aft end. In still another form, the bypass duct 28 can have a substantially annular shape in axial cross-section, while the third stream duct 30 can have an annular shape in axial cross-section at its forward end that transitions to a rectangular shape at its aft end.

The type of flow control device 34, as well as the desired quantity, location, etc. of the flow control device 34, can depend on the geometry and relative positions of the bypass duct 28, the third stream duct 30, and the primary airstream duct 40. In the FIG. 2 embodiment, for example, a plurality of flap-type flow control devices 34 are circumferentially disposed in the upper and lower arc shape portions 30a, 30b of the third stream duct 30, where the flaps of the flow control devices 34 combine to have a shape that corresponds to the annular shape of the third stream duct 30.

The third stream duct 30 and the primary airstream duct 40 terminate at the entry of the exhaust nozzle 26. A junction or flange portion 44, which can be suitably connected to a frame section of the multi stream aircraft engine 10, can join the forward end of the exhaust nozzle 26 to the aft ends of the third stream duct 30 and the primary airstream duct 40. As shown in FIG. 2, slightly forward of the flange portion 44, the inner wall of the third stream duct 30 slightly converges as it approaches the entry of the exhaust nozzle 26. Further, the inner wall of the third stream duct 30 and the outer wall of the primary airstream duct 40 are spaced apart at the flange portion 44 by a gap D.

The exhaust nozzle 26 includes a primary airstream nozzle 50 and an offtake airstream nozzle 48 disposed radially outward from the primary airstream nozzle 50. For ease and clarity of description, the offtake airstream nozzle 48 is also referred to herein as having upper and lower offtake airstream portions 52, 54. The terms upper and lower in this sense are not intended to be limiting but rather to indicate the position of portions of the offtake airstream nozzle 48 relative to the primary airstream nozzle 50, as shown in FIG. 2. The forward end of the primary airstream nozzle 50 is coterminous with and in fluid communication with the aft end of the primary airstream duct 40. As such, in the FIG. 2 embodiment forward ends of upper and lower walls 56, 58 of the primary airstream nozzle 50 form a shape that corresponds to that of the shape of the aft end of the primary airstream duct 40. Similarly, the forward ends of the upper and lower offtake airstream portions 52, 54 of the offtake airstream nozzle 48 are coterminous with and in fluid communication with the aft ends of the upper and lower portions 30a, 30b of the third stream duct 30. Thus, in the FIG. 2 embodiment, radially outer and inner walls 66, 68 of the upper offtake airstream portion 52 form a shape in axial cross-section that corresponds to the shape of the aft end of the upper portion 30a of the third stream duct 30. Further, upper and lower walls 76, 78 of the lower offtake airstream portion 54 form a shape in axial cross-section that corresponds to the shape of the aft end of the lower portion 30b of the third stream duct 30.

The primary airstream nozzle 50 and the offtake airstream nozzle 48 are surrounded by an annular shape shell of the exhaust nozzle 26. The shell can include upper and lower walls 86, 88 that in cross section as viewed in FIG. 2 converge from the forward to aft direction. The exhaust nozzle 26 comprises a composite construction, although other materials may also be suitable as would occur to those skilled in the art.

The primary airstream nozzle 50 has a converging serpentine shape having low observable (LO) compatibility when viewed from aft. The primary airstream nozzle 50, from its forward to aft end, that is left to right in FIG. 2, curves slightly upward, then downward, and then slightly upward again while simultaneously decreasing in height from the forward to aft end; that is, the height between the upper and lower walls 56, 58 of the primary airstream nozzle 50 progressively decreases from the forward to aft end of the primary airstream nozzle 50. The distal end 80 of the primary airstream nozzle 50 terminates into an ejector 84 of the exhaust nozzle 26. In one form, the ejector 84 comprises a supersonic ejector, although other forms may be suitable. The offtake airstream nozzle 48 likewise has a converging serpentine shape having low observable (LO) compatibility when viewed from aft, although in the FIG. 2 embodiment, the degree of convergence of the offtake airstream nozzle 48 is less than that of the primary airstream nozzle 50. The distal ends 90, 92 of the upper and lower offtake airstream portions 52, 54 likewise terminate into the ejector 84 of the exhaust nozzle 26. In the FIG. 2 embodiment, the length of the primary airstream nozzle 50 is substantially the same as the length of the offtake airstream nozzle 48, such that the distal ends 90, 92 of the upper and lower offtake airstream portions 52, 54 are at substantially opposite sides, that is above and below as shown in FIG. 2, of the distal end 80 of the primary airstream nozzle 50.

As shown in FIG. 2, the radially inner wall 68 of the upper offtake airstream portion 52 and the upper wall 56 of the primary airstream nozzle 50 are spaced apart by the gap D at their forward ends, but converge to a relatively narrower edge portion at their aft, or distal, ends. Similarly, the upper wall 76 of the lower offtake airstream portion 54 and the lower wall 58 of the primary airstream nozzle 50 are spaced apart by the gap D at their forward ends, but converge to a relatively narrower edge portion at their aft, or distal, ends.

During operation of the multi stream aircraft engine 10, and owing to the converging configuration of the exhaust nozzle 26, the third airstream can pass through the third stream duct 30 and the upper and lower offtake airstream portions 52, 54 of the offtake airstream nozzle 48, and integrate with the primary airstream that passes through the primary airstream duct 40 and the primary airstream nozzle 50. The integration takes place, for example, at the distal ends 90, 92 of the respective upper and lower offtake airstream portions 52, 54, and the distal end 80 of the primary airstream nozzle 50, in the respective upper and lower portions of the primary airstream, at the ejector 84 of the exhaust nozzle 26.

The multi stream aircraft engine 10 can provide a constant mass flow rate to the exhaust nozzle 26, for example, for flight points between from 100 percent thrust to about 60 percent thrust. In an embodiment, in a thrust operation mode of the multi stream aircraft engine 10 before shifting into a specific fuel consumption (SFC) mode of operation, the third airstream flow rate can change for example from 10 percent to about 50 percent of the total inlet flow. The third airstream flow is at a pressure ratio that is less than half of the primary airstream flow. In an embodiment, from a pressure balance standpoint, in order to reduce the static pressure such that the primary airstream flow and the third airstream flow can be combined, the primary airstream flow is accelerated beyond sonic velocity.

Figure 3A:
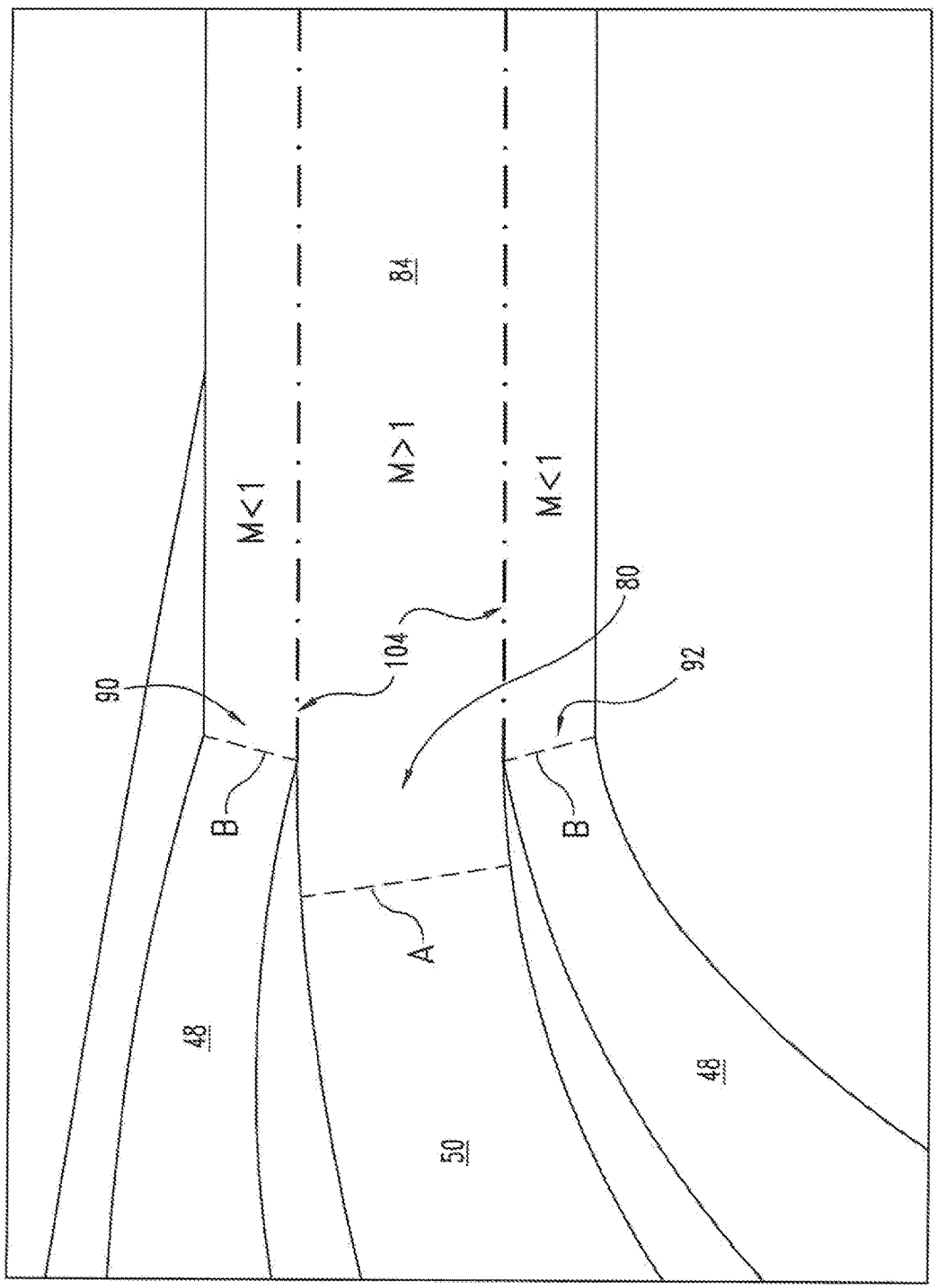
FIGS. 3A and 3B show slip lines of multiple airstreams in a downstream end of the FIG. 2 exhaust nozzle.
Figure 3B:
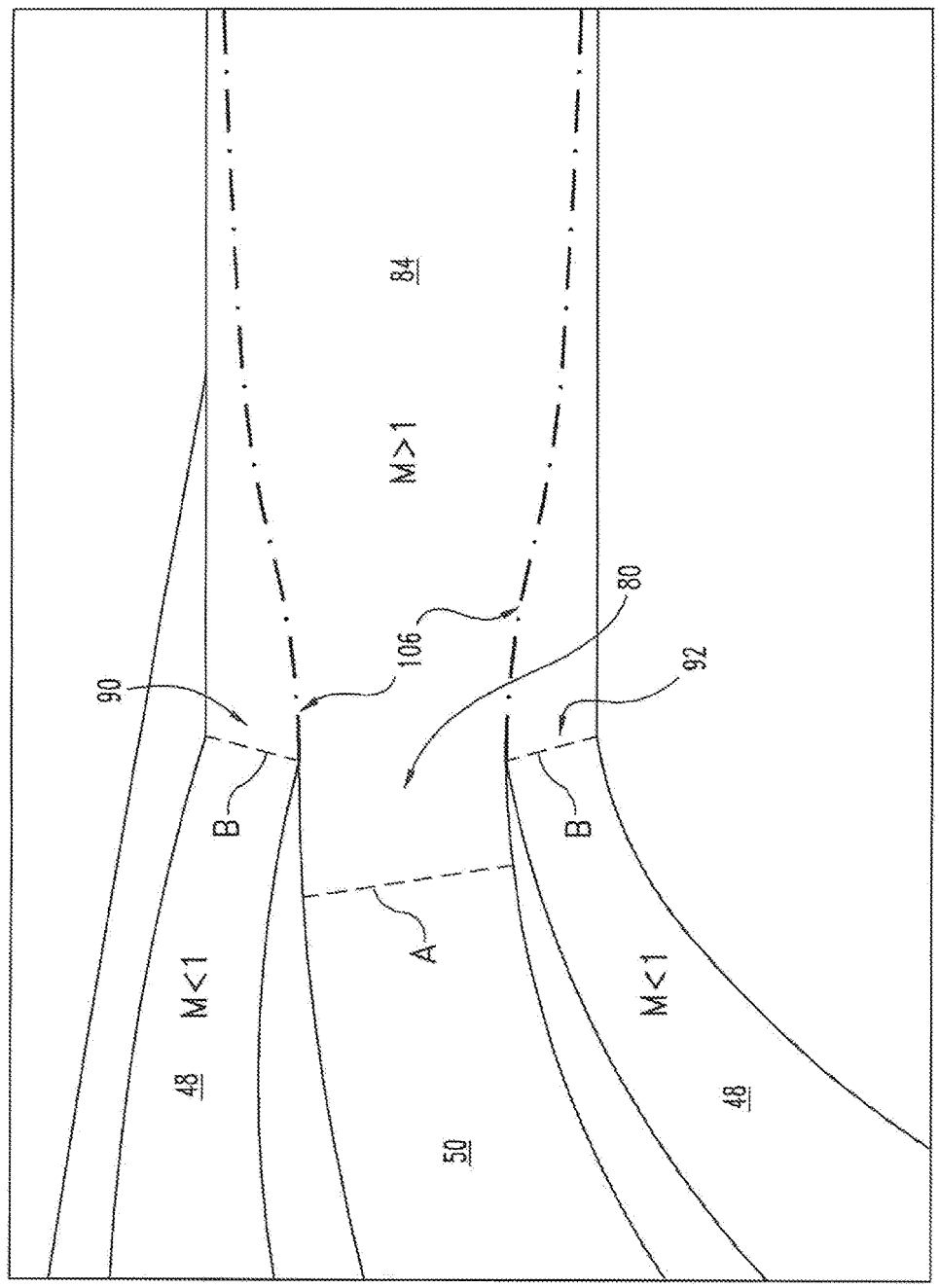

FIGS. 3A and 3B show Mach slip lines of a downstream end of the FIG. 2 exhaust nozzle 26, which depicts various Mach regions. In particular, FIG. 3A shows an example of a high third stream flow percent, as may be the case in a specific fuel consumption (SFC) mode of operation, and FIG. 3B shows an example of a low third stream flow percent, as may be the case in a thrust mode of operation. In the figures, the reference character M represents Mach, the dash-dot-dash lines represent slip lines between the primary airstream flow and the third airstream flow, the dashed lines marked A represent the internal fixed throat of the primary airstream, and the dashed lines marked B represent the internal fixed throat of the third airstream.

In an embodiment, the primary airstream is accelerated to the internal fixed throat A and then supersonically to the ejector 84 at which it experiences the third airstream. In the case of the SFC mode shown for example in FIG. 3A, the total pressure of the primary airstream and the total pressure of the third airstream are substantially the same. As such, the primary airstream continues to accelerate slowly, as generally indicated by the non radially expanding slip lines of the primary airstream relative to the third airstream at reference numeral 104, as viewed in cross section through the axis of the ejector 84, balancing static pressures within the exhaust nozzle 26 with the third airstream. In the case of the thrust mode shown for example in FIG. 3B, the total pressures are substantially different, in particular, the total pressure of the primary airstream is substantially greater than the total pressure of the third airstream. As such, the primary airstream expands and accelerates quickly, as generally indicated by the radially outwardly expanding slip lines of the primary airstream relative to the third airstream at reference numeral 106, as viewed in cross section through the axis of the ejector 84, again balancing static pressures within the exhaust nozzle 26.

The area ratio experienced by the primary airstream depends on the pressure differential between the primary airstream and the third airstream. In one form, the area ratio experienced by the primary airstream varies depending upon the amount of third airstream passing through the exhaust nozzle 26. Thus, the third airstream accelerates and experiences in the upper and lower offtake airstream portions 52, 54 of the offtake airstream nozzle 48 a fixed throat area B owing to the fixed geometry of the exhaust nozzle 26, but once the third airstream experiences, that is integrates with, the primary airstream at the distal ends 90, 92 of the upper and lower offtake airstream portions 52, 54 and the distal end 80 of the primary airstream nozzle 50, the third airstream can either expand and thus slow again from the fixed throat B, or the third airstream can accelerate to an effective throat formed by the expanding primary airstream. In one form, the ejector action of the primary airstream in the ejector 84 contributes to the flow to effect a slightly higher energy stream and therefore the exhaust nozzle 26 generates thrust effectively notwithstanding there may be a total pressure difference between the primary airstream and the third airstream.

By having one fixed geometry nozzle which provides a variable area ratio to the primary airstream, a broad nozzle pressure ratio sweep of high efficiency performance can be generated. In the SFC mode of operation, or high third stream flow percent, shown for example in FIG. 3A, the primary airstream and the third airstream can be substantially balanced in mass flow and pressure and the primary nozzle pressure ratio can be relatively low. With these conditions entering the exhaust nozzle 26, both airstreams take up substantially equal physical area and experience a relatively low effective nozzle area ratio; thus, a relatively high nozzle efficiency can be attained. On the other hand, in the case of the low third stream flow percent shown for example in FIG. 3B, for example in the case of a thrust mode at a relatively high throttle setting, most of the airstream passes through the primary airstream nozzle 50 of the exhaust nozzle 26, and thus the effective area ratio experienced by the airstream can be for example two times greater than what the airstream experiences in the case of the SFC mode shown in FIG. 3A; thus, again, a relatively high nozzle efficiency can be attained.

This effect can also be realized in the case where the multi stream aircraft engine 10 remains in the thrust mode, and reduces the thrust of the multi stream aircraft engine 10 while maintaining total inlet capture flow. The core airstream can be reduced and can operate at a relatively lower nozzle pressure ratio as the throttle is pulled back. The extra air not needed by the engine core can be shifted into the third stream duct 30, for example via the flow control device 34, and, accordingly, the effective area ratio experienced in the exhaust nozzle 26 can be reduced. With this balance between the third airstream and the primary airstream in the ejector 84, efficient nozzle performance can be attained.

Figure 4A:
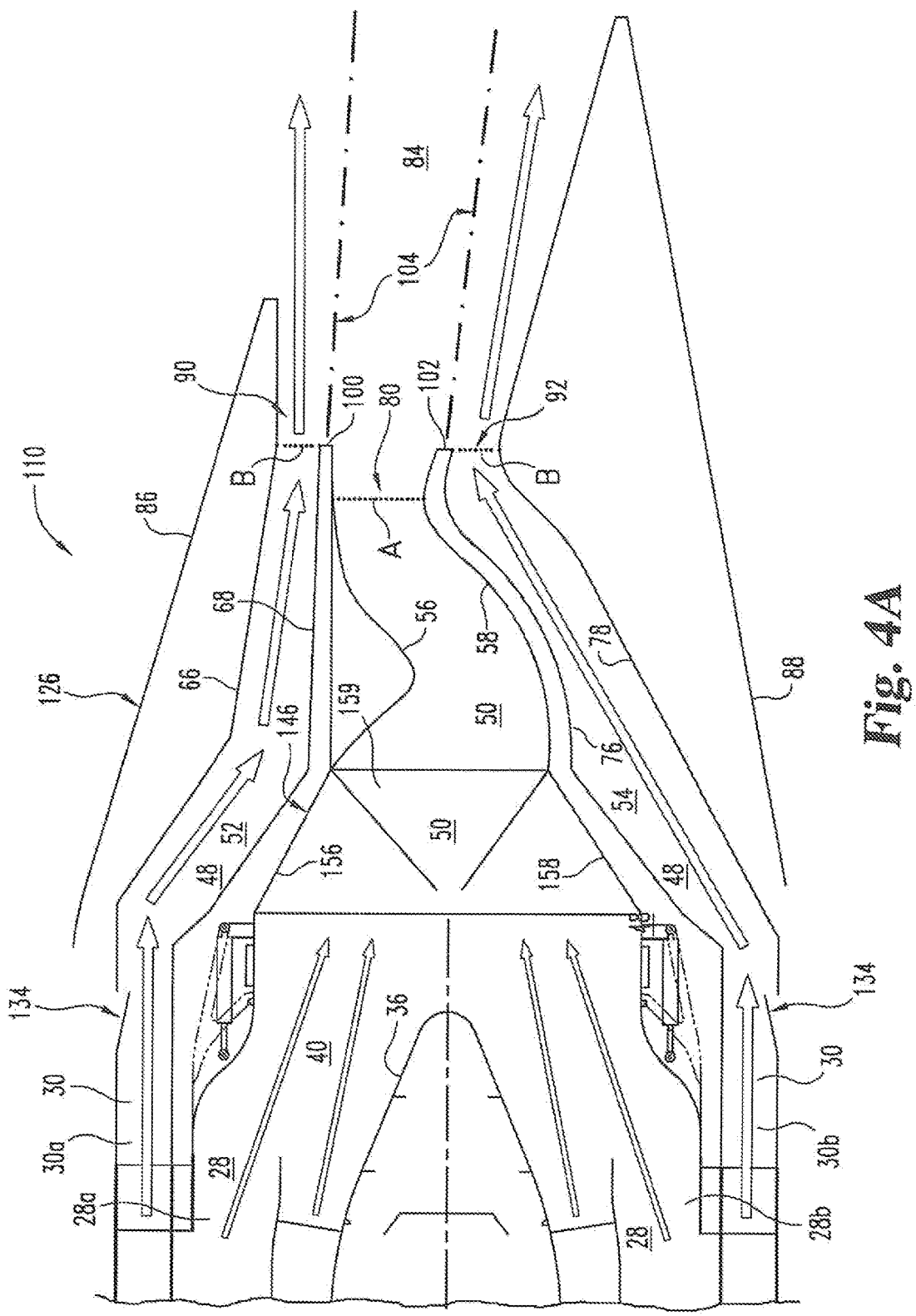
FIGS. 4A and 4B show an aft end of a multi stream aircraft engine according to an embodiment, including an exhaust nozzle thereof, and flap mechanisms shown in respective open and restricting positions.
Figure 4B:
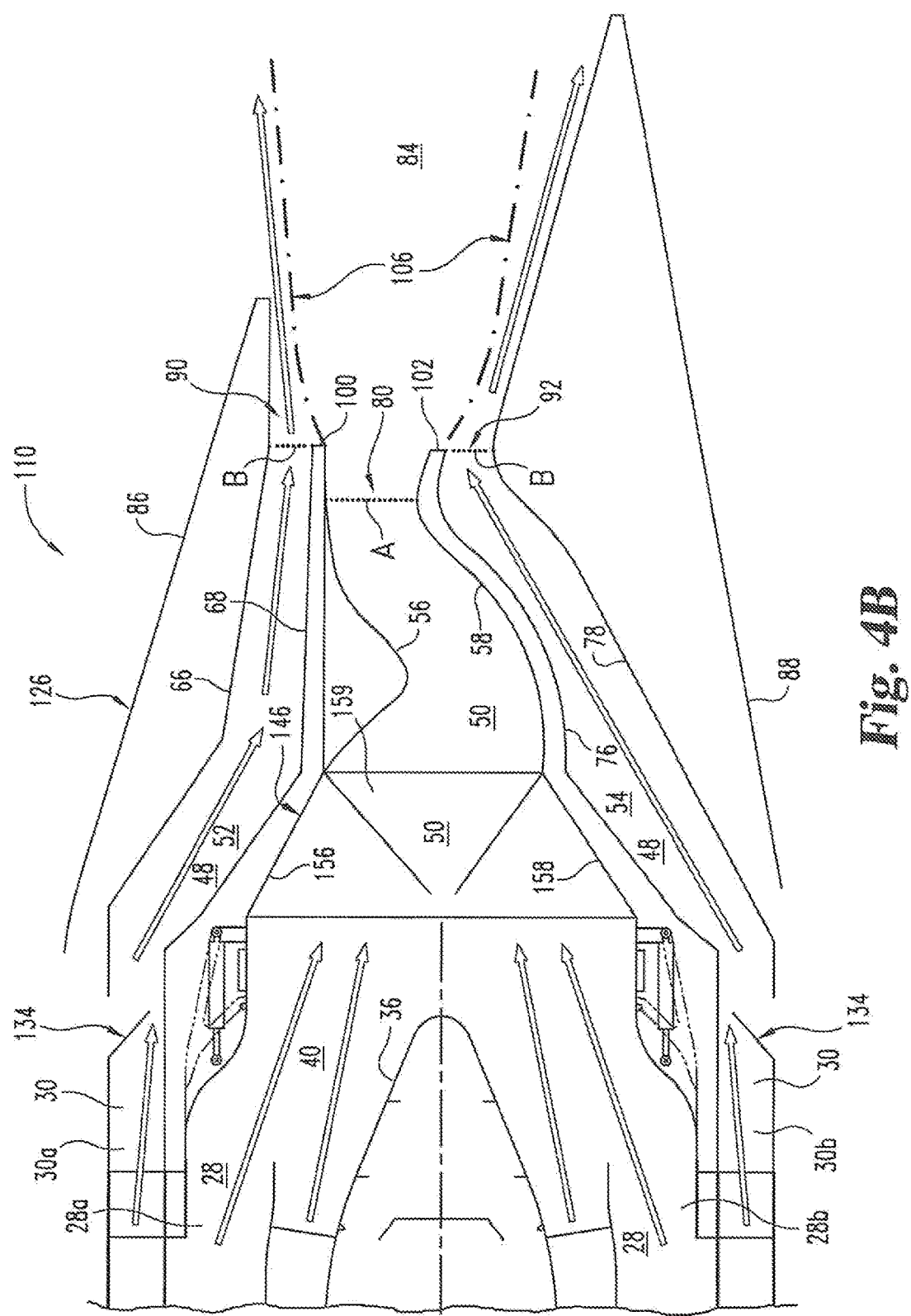

FIGS. 4A and 4B show an aft end of a multi stream aircraft engine 110 according to an embodiment, including an exhaust nozzle 126. In the figures, and as used herein, like components are denoted by like reference numerals, and the description that follows describes additions and/or differences in the various components.

The primary exhaust nozzle 50 of the exhaust nozzle 126 has a forward portion converging member and an aft portion serpentine converging structure having low observable (LO) compatibility when viewed from aft. Upper and lower walls 156, 158 of the converging member 146 angle radially inwardly in the forward to aft direction. Opposite facing side walls, only the left side wall 159 of which is shown in the figures, likewise angle radially inwardly in the forward to aft direction of the exhaust nozzle 126. The aft end of the converging member 146 is coterminous with and in fluid communication with a substantially rectangular shape forward end of the serpentine converging structure of the primary exhaust nozzle 50. As such, in the embodiment of FIGS. 4A-4B, the upper and lower walls 156, 158 and the left and right side walls of the converging member 146 form at their aft end a substantially rectangular shape in axial cross-section that corresponds to the substantially rectangular shape of the forward end of the serpentine converging structure. The serpentine structure of the primary exhaust nozzle 50 of the FIGS. 4A-4B exhaust nozzle 126 is relatively shorter in length than the serpentine structure of the primary exhaust nozzle 50 of the FIG. 2 exhaust nozzle 26 due in part to accommodating the converging member 146 and also due in part to facilitating a relatively shorter overall length exhaust nozzle 126.

The upper and lower offtake airstream nozzles 52, 54 of the exhaust nozzle 126 have a converging serpentine shape, but the degree of convergence in the embodiment of FIGS. 4A-4B is greater at the forward end than that of the upper and lower offtake airstream portions 52, 54 of the offtake airstream nozzle 48 in the embodiment of FIG. 2. In particular, the forward portions of the upper and lower offtake airstream nozzles or portions 52, 54 angle radially inwardly in the forward to aft direction substantially alongside the converging member 146. The aft portion of the lower offtake airstream portion 54 has a serpentine contour that is substantially similar to the serpentine contour of the lower wall 58 of the primary airstream nozzle 50. The aft portion of the upper offtake airstream portion 52 follows a gradual radially inward and substantially linear taper; the radially inner wall 68 of the upper offtake airstream portion 52 does not follow the serpentine contour of the upper wall 56 of the primary airstream nozzle 50.

The multi stream aircraft engine 110 of the embodiment of FIGS. 4A and 4B includes third stream pressure/area flow control devices 134 in the form of flaps disposed in the upper and lower portions 30a, 30b of the third stream duct 30. The flaps 134 are selectively operable over a range between an open position, a restricted position, and a closed position. In the open position, shown in FIG. 4A, the flaps 134 permit a relatively large amount of the third airstream to pass through the upper and lower portions 30a, 30b of the third stream duct 30, and to and through the respective upper and lower offtake airstream portions 52, 54 of the offtake airstream nozzle 48. In a restricted position, shown in FIG. 4B, the flaps 134 allow a relatively less amount of the third airstream to pass through the upper and lower portions 30a, 30b of the third stream duct 30, and, accordingly, a relatively less amount to and through the upper and lower offtake airstream portions 52, 54 of the exhaust nozzle 126.

During operation of the multi stream aircraft engine 110, and owing to the converging configuration of the exhaust nozzle 126, the third airstream can pass through the third stream duct 30 and the upper and lower offtake airstream portions 52, 54 of the offtake airstream nozzle 48, and integrate with the primary airstream that passes through the primary airstream duct 40 and the primary airstream nozzle 50. The integration takes place, for example, at the distal ends 90, 92 of the respective upper and lower offtake airstream portions 52, 54, and the distal end 80 of the primary airstream nozzle 50, in the respective upper and lower portions of the primary airstream, at the ejector 84 of the exhaust nozzle 126.

FIGS. 4A and 4B have superimposed thereon Mach slip lines of, respectively, a high third stream flow percent, as may be the case in a specific fuel consumption (SFC) mode of operation, and a low third stream flow percent, as may be the case in a thrust mode of operation. The dash-dot-dash lines represent slip lines between the primary airstream and the third airstream. As shown in FIG. 4A, when the flaps 134 are open and thus permitting a relatively greater amount of the third airstream to pass through the exhaust nozzle 126, the primary airstream in the ejector 84 continues to accelerate relatively slowly, as generally indicated by the non radially expanding slip lines of the primary airstream relative to the third airstream at reference numeral 104, as viewed in cross section through the axis of the ejector 84, balancing static pressures within the exhaust nozzle 126 with the third airstream when, for example, total pressures are similar. As shown in FIG. 4B, when the flaps 134 are in a restricted position and thus permitting a relatively less amount of the third airstream to pass through the exhaust nozzle 126, the primary airstream expands and accelerates quickly, as generally indicated by the radially outwardly expanding slip lines of the primary airstream relative to the third airstream at reference numeral 106, as viewed in cross section through the axis of the ejector 84, again balancing static pressures when, for example, the total pressures are substantially different.

Figure 5A:
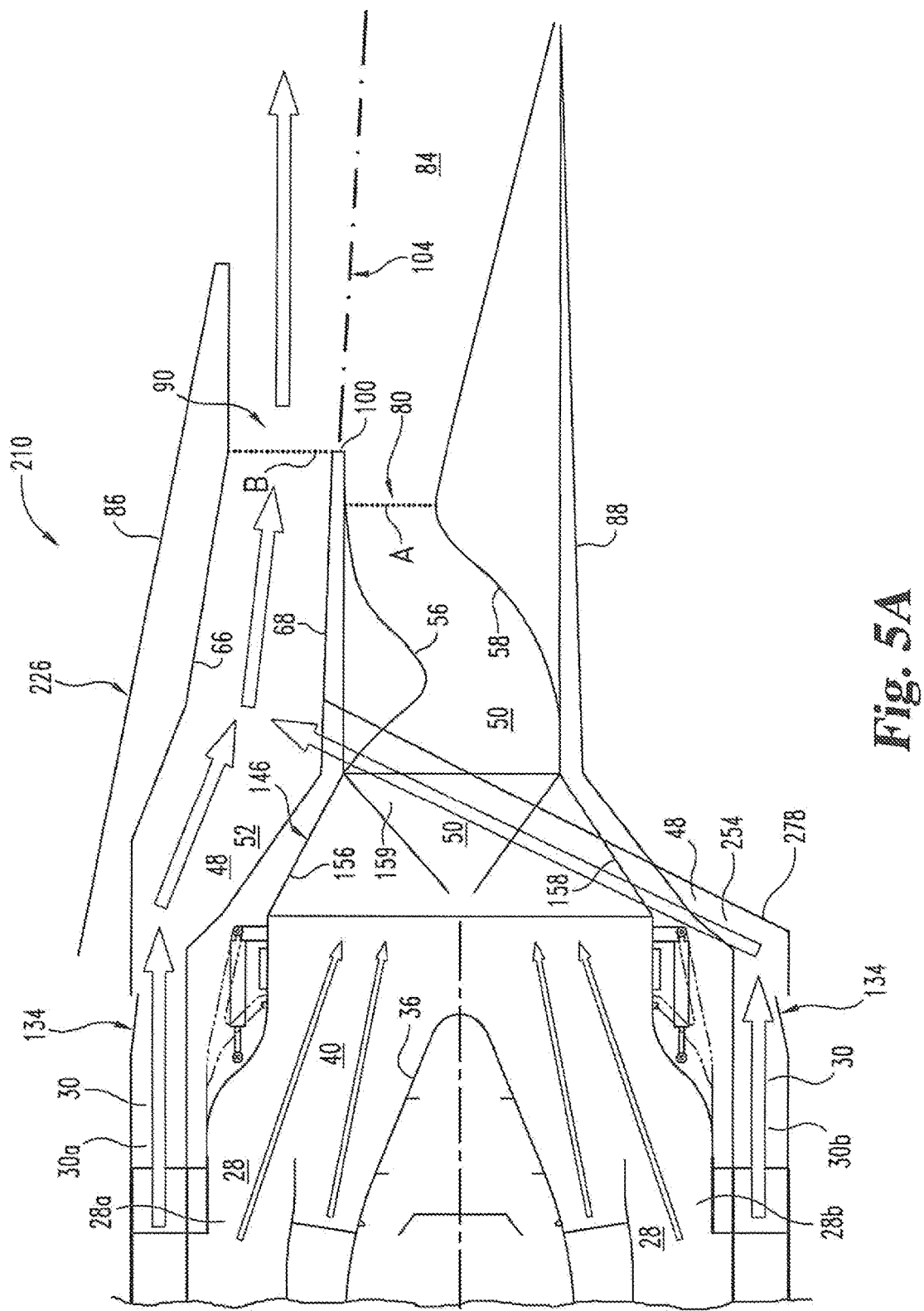
FIGS. 5A and 5B show an aft end of a multi stream aircraft engine according to an embodiment, including an exhaust nozzle thereof, and flap mechanisms shown in respective open and restricting positions.
Figure 5B:
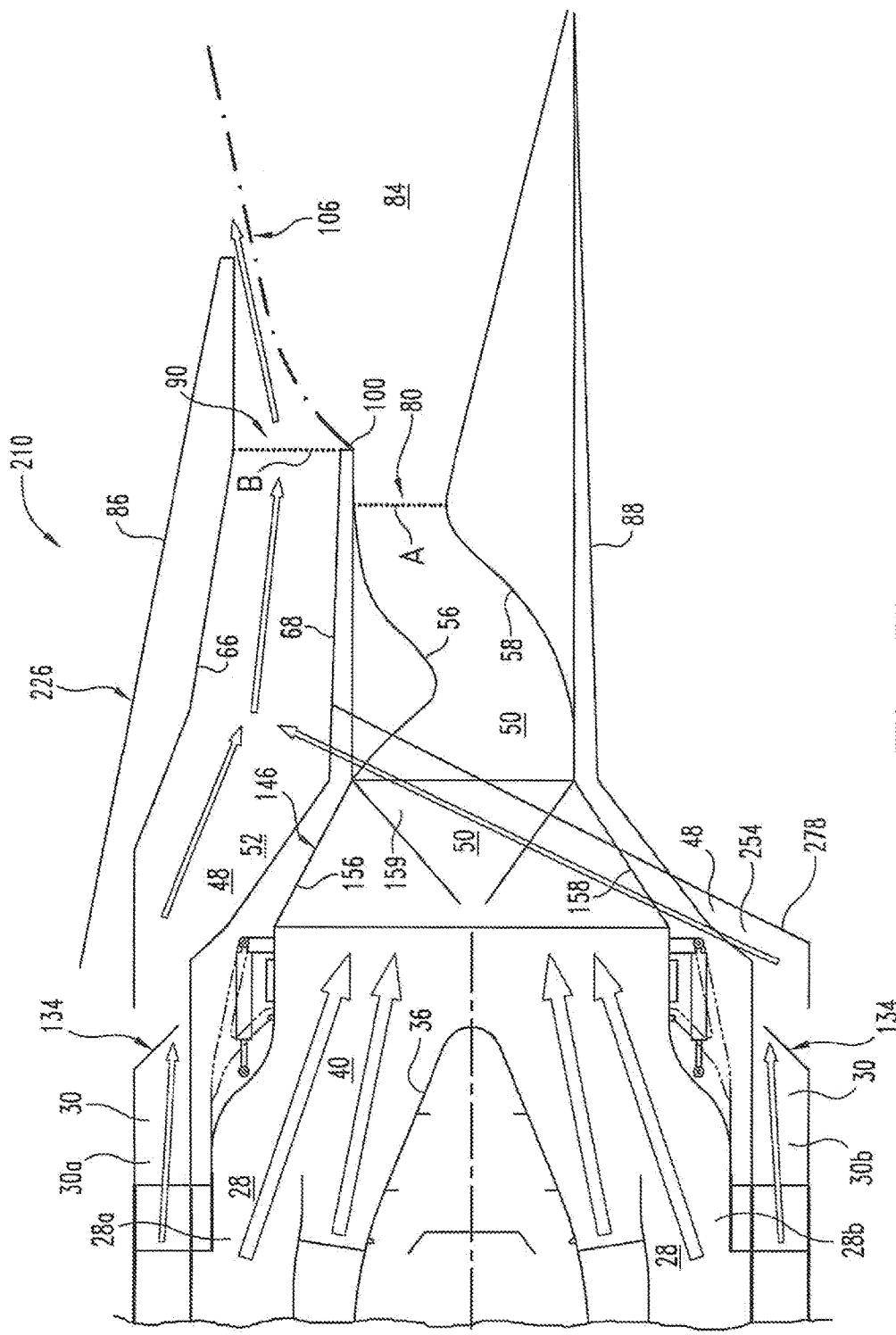

FIGS. 5A and 5B show an aft end of a multi stream aircraft engine 210 according to an embodiment, including an exhaust nozzle 226. In the figures, and as used herein, like components are denoted by like reference numerals, and the description that follows describes additions and/or differences in the various components.

In the embodiment of FIGS. 5A and 5B, the offtake airstream nozzle 48 differs from the offtake airstream nozzle 48 of earlier described embodiments in that the lower offtake airstream portion 254 has a different configuration from that of the earlier described lower offtake airstream portion 54. Rather than extend below the primary airstream nozzle 50, the lower offtake airstream portion 254 extends, in the forward to aft direction in FIGS. 5A-5B, upward and around the primary airstream nozzle 50. In one form, the lower offtake airstream portion 254 can have for example two branches that extend upward and around the primary airstream nozzle 50, forming for example a substantially U-shape configuration in axial cross-section. The lower offtake airstream portion 254 terminates at the lower or radially inner wall 68 of the upper offtake airstream portion 52 of the offtake airstream nozzle 48, at which the lower offtake airstream portion 254 is in fluid communication with the upper offtake airstream portion 52 such that during operation of the multi stream aircraft engine 210 the third airstream passing through the lower offtake airstream portion 254 merges with the third airstream passing through the upper offtake airstream portion 52. In the illustrative embodiment, the upper offtake airstream portion 52 has a relatively larger axial cross-section area than that of, for example, the upper offtake airstream portion 52 described above with respect to the embodiments of FIG. 2 and FIGS. 4A-4B. It will be appreciated that the axial cross-section area of the upper offtake airstream portion 52 of the FIGS. 5A-5B embodiment can be relatively smaller than, or even substantially the same as, that of the upper offtake airstream portions 52 described above with respect to the embodiments of FIG. 2 and FIGS. 4A-4B.

In the illustrative embodiment, the lower offtake airstream portion 254 extends upward and around the primary airstream nozzle 50 at both sides of the primary airstream nozzle 50. Further, the lower offtake airstream portion 254 terminates at, and becomes in fluid communication with, the upper offtake airstream portion 52 axially along the axis of the exhaust nozzle 226 at the location corresponding to where the upper offtake airstream portion 52 curves alongside the junction of the forward portion converging member 146 and the aft portion serpentine converging structure of the primary airstream nozzle 50. The exhaust nozzle 226 is not limited to such configuration, and other embodiments are contemplated. In one form, the lower offtake airstream portion 254 can extend upward and around the primary airstream nozzle 50 along only one side of the primary airstream nozzle 50. In another form, the lower offtake airstream portion 254 can comprise greater than two branches that extend upward and around the primary airstream nozzle 50. Further, in one form, the lower offtake airstream portion 254 can terminate at, and become in fluid communication with, the upper offtake airstream portion 52 at a location axially along the axis of the exhaust nozzle 226 that is different from that in the illustrated embodiment, for example, forward or aft of the location corresponding to where the upper offtake airstream portion 52 curves alongside the junction of the forward portion converging member 146 and the aft portion serpentine converging structure of the primary airstream nozzle 50. In one form, the lower offtake airstream portion 254 has multiple branches that extend upward and around the primary airstream nozzle 50 and terminate and become in fluid communication with the upper offtake airstream portion 52 at multiple axial locations. The configuration of the lower offtake airstream portion 52, and the quantity and size of branches, and the merge locations with the upper offtake airstream portion 52, can vary depending on the application of the multi stream aircraft engine 210.

During operation of the multi stream aircraft engine 210, and owing to the converging configuration of the exhaust nozzle 226, the third airstream can pass through the third stream duct 30 and the upper and lower offtake airstream portion or nozzles 52, 254 of the offtake airstream nozzle 48, and integrate with the primary airstream that passes through the primary airstream duct 40 and the primary airstream nozzle 50. Unlike the embodiment of FIGS. 2 and 4A-4B, where the integration takes place at the distal ends 90, 92 of the respective upper and lower offtake airstream portions 52, 54, and the distal end 80 of the primary airstream nozzle 50 in the upper and lower portions of the primary airstream, integration in the embodiment of FIGS. 5A-5B takes place at the distal end 90 of the upper offtake airstream portion 52 and the distal end 80 of the primary airstream nozzle 50; that is, only in the upper portion of the primary airstream, at the ejector 84 of the exhaust nozzle 226.

FIGS. 5A and 5B have superimposed thereon Mach slip lines of, respectively, a high third stream flow percent, as may be the case in a specific fuel consumption (SFC) mode of operation, and a low third stream flow percent, as may be the case in a thrust mode of operation. The dash-dot-dash lines represent slip lines between the primary airstream and the third airstream. As shown in FIG. 5A, when the flaps 134 are open and thus permitting a relatively greater amount of the third airstream to pass through the exhaust nozzle 226, the primary airstream in the ejector 84 continues to accelerate relatively slowly, as generally indicated by the slip line of the primary airstream relative to the third airstream at reference numeral 104, as viewed in cross section through the axis of the ejector 84, balancing static pressures within the exhaust nozzle 226 with the third airstream when, for example, total pressures are similar. Further, as the third airstream in the embodiment of FIGS. 5A-5B is channeled entirely through the distal end 90 of the upper offtake airstream portion 52 of the offtake airstream nozzle 48, the third airstream is exhausted only above the primary airstream in the ejector 84, rather than above and below as in earlier described embodiments. As shown in FIG. 5B, when the flaps 134 are in a restricted position and thus permitting a relatively less amount of the third airstream to pass through the exhaust nozzle 226, the primary airstream expands and accelerates quickly, as generally indicated by the radially outwardly expanding slip line of the primary airstream relative to the third airstream at reference numeral 106, as viewed in cross section through the axis of the ejector 84, again balancing static pressures when, for example, the total pressures are substantially different. In the embodiment of FIGS. 5A-5B, as there is no third airstream below the primary airstream, the slip line expands only upwardly in the ejector 84 of the exhaust nozzle 226.

The multi stream aircraft engine 10 described herein comprises a gas turbine engine, for example as shown in FIG. 1, although it will be appreciated that the multi stream aircraft engine 10 can comprise any aircraft engine in which a multiple stream flow system is employed. Thus, in one form, the multi stream aircraft engine 10 can comprise a turbofan engine having an air bypass surrounding the core of the engine. In another form, the multi stream aircraft engine 10 can comprise ram/scram jet flows with auxiliary air flows. Still other forms may be suitable.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A multi stream aircraft fixed geometry nozzle comprising:
   an inner nozzle;
   an outer nozzle disposed radially outward of the inner nozzle; and
   a supersonic ejector disposed axially aft of the inner nozzle and outer nozzle;
   a fan supplying motive fluid to form a bypass stream and a third stream;
   the inner nozzle being configured to channel a primary stream of a mixture of a propulsive core stream from an engine core and the bypass stream from a bypass duct surrounding the engine core, from an aft end of the engine core to the supersonic ejector; and
   the outer nozzle being configured to channel the third stream from an aft end of a third stream duct surrounding the bypass duct to the supersonic ejector to merge the third stream with the primary stream;
   the fixed geometry nozzle including a flow control device comprising a plurality of flaps attached to a radially outer wall of the third stream duct which deploy radially inward from the radially outer wall, the flow control device configured to operate the fixed geometry nozzle between an SFC mode and a thrust mode such that, when the inner nozzle accelerates the primary stream supersonically to the supersonic ejector, at which the primary stream is merged with the third stream, in the SFC mode a total pressure of the primary stream is substantially the same as a total pressure of the third stream, and in the thrust mode the total pressure of the primary stream is substantially greater than the total pressure of the third stream.

2. The multi stream aircraft fixed geometry nozzle of claim 1 in which the inner nozzle has an internal fixed throat at its aft end and the primary stream is accelerated to the internal fixed throat before being accelerated supersonically to the supersonic ejector.

3. The multi stream aircraft fixed geometry nozzle of claim 1 in which in the SFC mode slip lines between the primary stream and the third stream are non radially expanding as viewed in cross section through an axis of the supersonic ejector.

4. The multi stream aircraft fixed geometry nozzle of claim 1 in which in the thrust mode slip lines between the primary stream and the third stream are radially outwardly expanding as viewed in cross section through an axis of the supersonic ejector.

5. The multi stream aircraft fixed geometry nozzle of claim 1 in which the supersonic ejector is configured so that an area ratio experienced by the primary stream in the supersonic ejector depends on a pressure differential between the primary stream and the third stream.

6. The multi stream aircraft fixed geometry nozzle of claim 1 in which the supersonic ejector is configured so that an area ratio experienced by the primary stream in the supersonic ejector depends on an amount of third stream passing through the outer nozzle.

7. The multi stream aircraft fixed geometry nozzle of claim 1 in which the supersonic ejector is configured so that the primary stream experiences an area ratio in the thrust mode about two times greater than the area ratio in the SFC mode.

8. The multi stream aircraft fixed geometry nozzle of claim 1 in which the outer nozzle comprises upper and lower outer nozzle portions, and the lower outer nozzle portion extends upward and around the inner nozzle to and into fluid communication with the upper outer nozzle portion, and the upper outer nozzle portion channels the third stream to an upper portion of the primary stream.

9. The multi stream aircraft fixed geometry nozzle of claim 8 in which the length of the inner nozzle is substantially the same as the length of the upper outer nozzle portion such that the distal end of the upper outer nozzle portion is substantially alongside the distal end of the inner nozzle, and further wherein the inner nozzle and the outer nozzle have an annular shape in axial cross section.

10. The multi stream aircraft fixed geometry nozzle of claim 1 further comprising
    an aircraft engine having the engine core configured to generate the propulsive core stream;
    the bypass duct surrounding the engine core and configured to channel the bypass stream from an inlet of the aircraft engine to the aft end of the engine core for mixture with the propulsive core stream to form the primary stream; and
    the third stream duct surrounding the bypass duct and configured to channel the third stream from the inlet of the aircraft engine to a forward end of the fixed geometry nozzle.

11. A multi stream aircraft engine comprising:
    an exhaust nozzle;
    an engine core configured to generate a propulsive core flow;
    a fan supplying motive fluid to form a bypass flow and a third flow;
    a bypass flow duct surrounding the engine core and configured to channel the bypass flow to an aft end of the engine core to mix the bypass flow with the propulsive core flow to form a primary flow;

a third flow duct surrounding the bypass duct and configured to channel the third flow to a forward end of the exhaust nozzle;

the exhaust nozzle including a primary nozzle configured to accelerate the primary flow from the aft end of the engine core to an ejector of the exhaust nozzle, and an outer nozzle that channels the third flow from the forward end of the exhaust nozzle downstream to the ejector; and a flow control member configured to selectively control the amount of the third flow through the outer nozzle, the flow control member disposed in the third flow duct at the aft end of the third flow duct axially adjacent to a forward end of the exhaust nozzle and comprising a plurality of flaps attached to a radially outer wall of the third stream duct which deploy radially inward from the radially outer wall.

12. The multi stream aircraft engine of claim 11 in which the flow control member is configured to selectively control the amount of the third flow through the outer nozzle by directing a portion of the third flow channeled by the third flow duct.

13. The multi stream aircraft engine of claim 11 in which the flow control member comprises a composite material.

14. The multi stream aircraft engine of claim 11 in which the flow control member comprises one or more flaps.

15. A method comprising using an engine core to generate a propulsive core flow;

channeling a bypass flow from a fan through a bypass flow duct surrounding the engine core to an aft end of the engine core and mixing the bypass flow with the propulsive core flow to form a primary flow;

channeling a third flow from the fan through a third flow duct surrounding the bypass duct to a forward end of an exhaust nozzle;

accelerating the primary flow through a primary nozzle of the exhaust nozzle from an aft end of the engine core to an ejector of the exhaust nozzle;

channeling the third flow through a third flow nozzle of the exhaust nozzle from the forward end of the exhaust nozzle downstream to the ejector; and selectively changing the position of a flow control member that is disposed in the third flow duct at an aft end of the third flow duct axially adjacent to a forward end of the exhaust nozzle to control the amount of the third flow through the third flow nozzle, the flow control member comprising a plurality of flaps attached to a radially outer wall of the third stream duct which deploy radially inward from the radially outer wall.

16. The method of claim 15 in which the position of the flow control member is selectively changed to arrange the primary flow to have a total pressure that is substantially equal to a total pressure of the third flow to continue accelerating the primary flow through the primary nozzle.

17. The method of claim 15 in which the position of the flow control member is selectively changed to arrange the primary flow to have a total pressure that is relatively greater than a total pressure of the third flow so that the primary flow expands in the ejector to narrow an effective throat of the third flow, wherein a degree of expansion corresponds to an increase in thrust.

18. The method of claim 15 in which the position of the flow control member is selectively changed to change a pressure differential between the primary flow and the third flow to effect a corresponding area ratio in the primary flow in the ejector.

19. The method of claim 15 in which the position of the flow control member is selectively changed to change the amount of third flow passing through the exhaust nozzle to effect a corresponding area ratio in the primary flow in the ejector.

* * * * *